No. 758,054. PATENTED APR. 26, 1904.
W. S. EDWARDS.
FLEXIBLE DROP LIGHT TUBING FOR GAS LAMPS AND BURNERS.
APPLICATION FILED APR. 23, 1903.
NO MODEL.

Witnesses:
Herman M. Krueger
Louis M. F. Whitehead

Inventor:
William S. Edwards
by Chas. G. Page
Atty.

No. 758,054.

Patented April 26, 1904.

UNITED STATES PATENT OFFICE.

WILLIAM S. EDWARDS, OF CHICAGO, ILLINOIS.

FLEXIBLE DROP-LIGHT TUBING FOR GAS LAMPS AND BURNERS.

SPECIFICATION forming part of Letters Patent No. 758,054, dated April 26, 1904.

Application filed April 23, 1903. Serial No. 153,981. (No model.)

*To all whom it may concern:*

Be it known that I, WILLIAM S. EDWARDS, a citizen of the United States, residing at Chicago, in the county of Cook and State of Illinois, have made a certain new and useful Improvement in Flexible Drop-Light Tubing for Portable Gas Lamps and Burners, of which the following is a specification.

My invention relates to flexible tubing adapted for connecting gas lamps and burners with a source of supply and commonly known as "drop-light" tubing for portable gas-lamps.

Objects of my invention are to avoid the objectionable odor of gas with which the outer covering of ordinary flexible tubing for portable gas-lamps usually becomes impregnated after a season of use; to avoid permanent kinks or bends in the tubing as the result of accidental jamming, twisting, or sharp bending, drop-light tubing heretofore involving a core of spirally-coiled wire, such as described in Letters Patent to M. M. Nicholls, No. 593,726, November 16, 1897; to counteract defects resulting from the tendency of flexible cement employed to become brittle and crack, and to provide a high-grade, desirable, and efficient construction of flexible tubing for portable gas lamps and burners.

Figure 1:
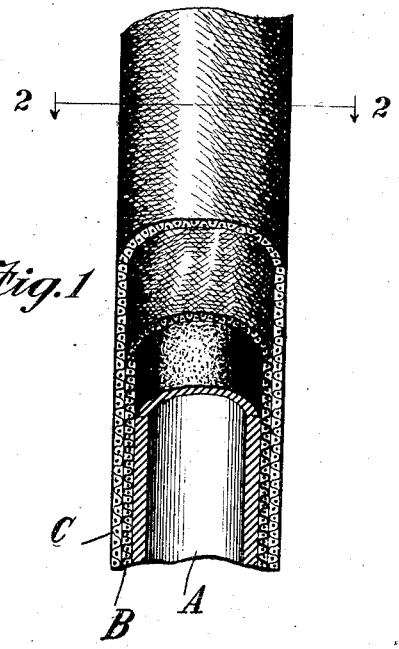
Figure 2:
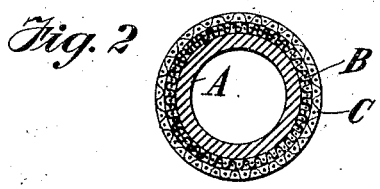

In the accompanying drawings, Figure 1 illustrates a section or portion of my improved flexible drop-light tubing with parts of the several layers broken away, the tubing shown being about twice the normal size in order to more clearly distinguish the different layers. Fig. 2 is a section on line 2 2 in Fig. 1.

The section of flexible tubing illustrated comprises a flexible tubular core A, of rubber, which is covered by a tubular layer B, of braided or woven textile material. This tubular layer B is rendered impervious by some suitable solution or cement which, while subserving such purpose, will become pliable when set or hardened, so as not to materially impair its flexibility. The impervious tubular layer B is inclosed by an outer flexible tubular layer or cover C, of some suitable braided or woven textile material—such, for example, as silk or mohair. The core A is composed of vulcanized soft rubber in contradistinction to hard rubber. The rubber core thus arranged is directly exposed to the action of gas and will in time soften under such action and in the course of time the cement compound employed will somewhat deteriorate; but by thus associating the rubber, fabric, and cement each of such elements will contribute to maintain the integrity of the whole regardless of individual accruing changes. The rubber, notwithstanding any changes which may take place in its primary condition, will continue to serve as a flexible and substantially impervious lining which is restrained by the next outer impervious tubular layer of fabric and cement, and this impervious layer will supplement the rubber and counteract defects which may in time occur in the tubular rubber core and protect the rubber from external atmospheric influences, and it will also resist further outward passage of oleaginous matter permeating the rubber. The tubular layer B of fabric can be dipped in or otherwise coated or treated with the cement compound or solution, which latter may be of any suitable material or materials, an effective compound for such purpose, for example, being formed of glue and glycerin. The tubing thus constructed and prepared will not in the course of time have that disagreeable odor of gas noticeable in the case of the flexible tubing for gas-lamps commonly made and sold, and in the case of a sudden bend or blow it will not become kinked or jammed out of shape, as in the case of ordinary tubing for gas-lamps, in which spirally-wound wire is usually incorporated.

The composite drop-light tube thus composed of the tubular layers A B C can of course be manufactured of any length, and sections or sublengths can be cut off therefrom as desired, since none of such layers obstruct the ready cutting of the tubing. The layers also permanently combine to form the composite tubing.

What I claim as my invention is—

As an article of manufacture, composite flexible drop-light tubing for portable gas lamps and burners composed of a tubular, vulcanized soft-rubber core A, a flexible tubular layer B, of fabric braided or woven textile material rendered impervious by suitable pliable cement and inclosing and forming a layer upon the tubular rubber core, and an outer tubular covering C, of woven textile material inclosing the said impervious tubular layer and forming the outer layer of the composite tubular structure.

WILLIAM S. EDWARDS.

Witnesses:
 CHAS. G. PAGE,
 ELIZABETH BURKE.